Nov. 30, 1943.    K. ZWICK    2,335,468
WORK TURNING DEVICE FOR MACHINE TOOLS
Filed Aug. 5, 1938    5 Sheets-Sheet 1
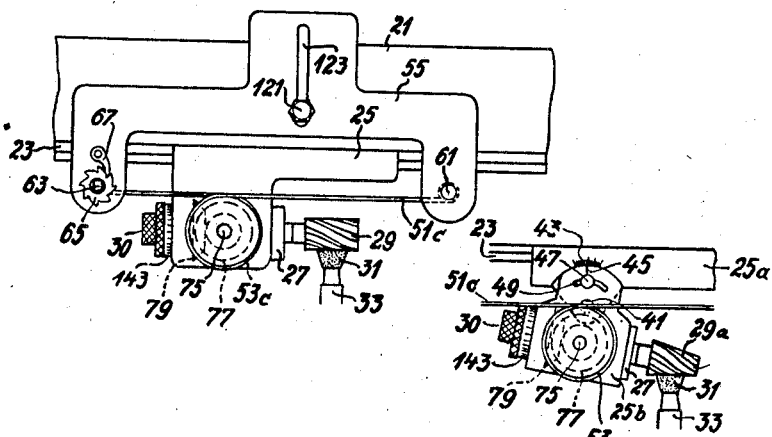
Fig. 1.
Fig. 2.
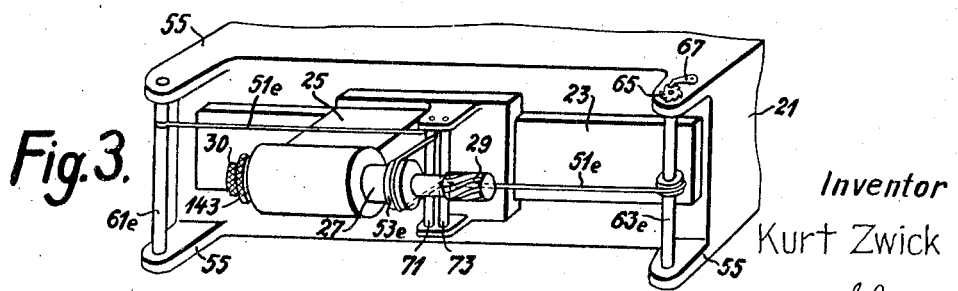
Fig. 3.
Inventor
Kurt Zwick
By Cumpston & Shepard
Attorneys Nov. 30, 1943.　　　　K. ZWICK　　　　2,335,468
WORK TURNING DEVICE FOR MACHINE TOOLS
Filed Aug. 5, 1938　　　5 Sheets-Sheet 2

Inventor
Kurt Zwick
By Cumpston & Shepard
Attorneys

Nov. 30, 1943.  K. ZWICK  2,335,468
WORK TURNING DEVICE FOR MACHINE TOOLS
Filed Aug. 5, 1938  5 Sheets-Sheet 3

Inventor
Kurt Zwick
By Cumpston & Shepard
Attorneys

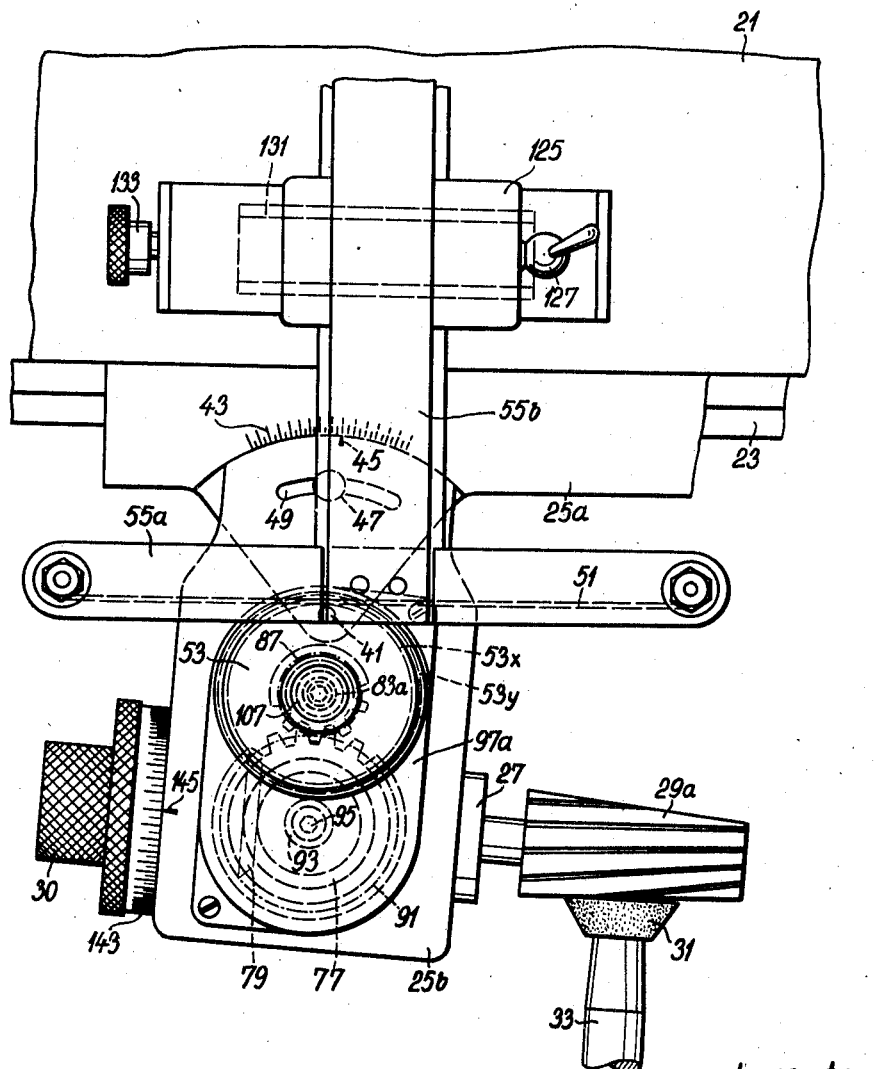

Patented Nov. 30, 1943

2,335,468

UNITED STATES PATENT OFFICE 2,335,468

WORK TURNING DEVICE FOR MACHINE TOOLS

Kurt Zwick, Munich, Germany; vested in the Alien Property Custodian

Application August 5, 1938, Serial No. 223,269
In Germany August 5, 1937

12 Claims. (Cl. 51—123)

The present invention deals with a device for turning work as it is traversed with respect to a tool operating upon the work. Work turning devices of this kind, although capable also of other uses, are especially helpful in connection with cutting, grinding, sharpening, or otherwise acting upon work having one or more spiral or helical portions, such as milling cutters, spiral or helical gears, etc.

An object of the invention is the provision of a generally improved and more satisfactory work turning device of the character above indicated.

Another object is the provision of a simple work turning device, easy and comparatively inexpensive to construct, having relatively few and simple moving parts, and sturdy in operation.

Still another object is the provision of a work turning device capable of providing a wide range of ratios of turning of the work to longitudinal movement thereof.

A further object is the provision of a work turning device capable of easy and quick adjustment to set the work in correct initial position with respect to the tool.

A still further object is the provision of a work turning device capable of operating easily with respect to conical work as well as cylindrical work.

To these and other ends the invention resides in certain improvements and combinations of parts, all as will be hereinafter more fully described, the novel features being pointed out in the claims at the end of the specification.

In the drawings:

Fig. 1 is a diagrammatic plan of a work turning device constructed in accordance with one embodiment of the invention;

Fig. 2 is a similar view with the device so constructed as to handle conical work;

Fig. 3 is a perspective view of still another modified form;

Fig. 15 is a diagrammatic plan of a machine in accordance with a preferred embodiment of the invention, illustrating the fact that many of the features individually shown in the preceding views may be used together in a single machine.

The same reference numerals throughout the several views indicate the same parts.

Figure 4:
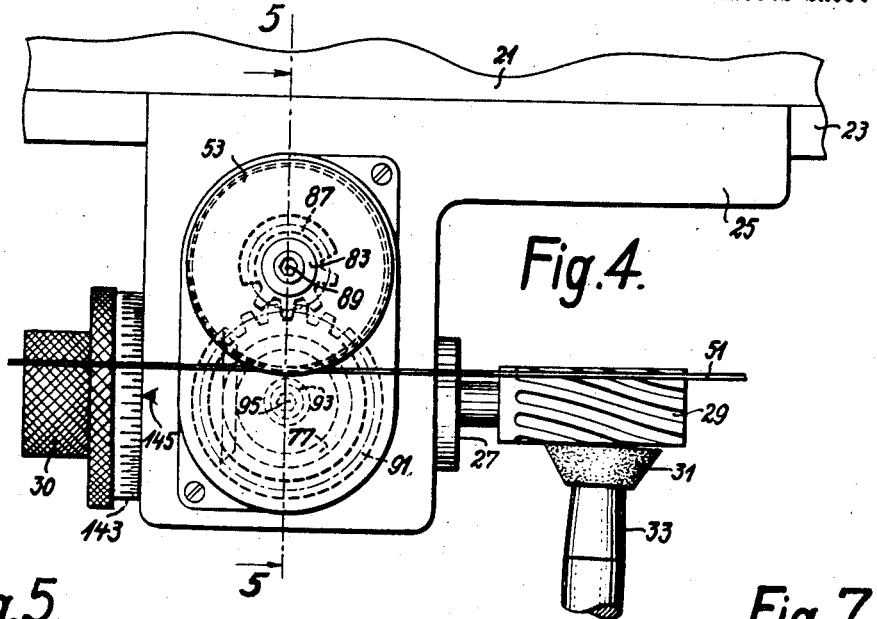
Fig. 4 is a diagrammatic plan of still another modification in which interchangeable gears are employed to obtain a greater change in ratio of turning of the work to longitudinal movement of the work.

In performing grinding and other operations upon spiral or helical milling cutters and on certain types of gears and other spiral or helical work, it is of great importance that the work be turned accurately in exact accordance with a predetermined ratio of turning to the longitudinal movement of the work relatively to the tool. Heretofore it has been proposed to drive the work in its turning movements from the same shaft or source of power that produces the longitudinal feeding movement of the work relatively to the tool. This prior arrangement is open to the grave disadvantage that it requires special and expensive gearing and relatively complicated and cumbersome mechanism.

According to the present invention, the longitudinal feeding of the work and the turning movement thereof are not both driven direct from a common source of power, but the turning movement of the work is accomplished by the turning of a rotary member mounted to move bodily with the work, which rotary member rolls on a track mounted on the frame of the machine. Thus the turning of the work is accomplished directly from the longitudinal movement of the work relatively to the tool, which results in a great simplification of the cumbersome and expensive structures heretofore employed.

For the sake of a convenient example, the invention is illustrated in the present application in connection with operations upon a helical milling cutter, that is, a milling cutter with helical or generally helical cutting teeth. It is to be understood that reference to a milling cutter is merely for the sake of a convenient example, and that the invention is equally applicable to worm gears, spiral or helical gears, or any other work having generally helical or spiral surfaces to be operated upon.

Referring now to Figs. 1 to 3 of the drawings, there is indicated diagrammatically at 21 a portion of the frame of the machine, which frame is provided with a guideway 23 along which a carriage 25 is movable. On this carriage is mounted a hollow shaft 27 on which the work 29 to be operated upon is clamped in any suitable known manner e. g. by means of a hand knob 30. A tool 31 is mounted on the frame 21 or any other suitable part of the machine in position to cooperate with and act upon the work 29 as the work is traversed past the tool by moving the carriage 25 along its guideway 23. The tool 31 may at times be a fixed tool, such as a planer tooth or the like, or it may be a rotating tool, such as a grinding member or milling member mounted on the rotating shaft 33 driven from any suitable source of power (not shown). Power means of any conventional kind may also be provided for moving the carriage 25 along its guideway 23, or the carriage may be moved by hand, by turning a feeding screw or the like.

When the machine is to be used for operating always upon substantially cylindrical work, the shaft 27 which carries the work 29 may be arranged permanently in a direction substantially parallel to the direction of the guideway 23. If the machine is to be used only for conical work always of the same angle of inclination, then the shaft 27 may be arranged permanently at a corresponding angle to the direction of the guideway 23. But when, as is preferably the case, the machine is designed so that it can be used with conical work of different angles, and also with cylindrical work, then the carriage 25 is preferably made in two sections, as indicated in Figs. 2 and 15 at 25a and 25b, the section 25b being pivoted to swing relatively to the section 25a about a pivot axis 41 lying in a plane preferably perpendicular to the direction of the guideway 23.

For convenience of adjustment, the section 25a may be provided with graduations 43 in degrees or other suitable units, cooperating with an index mark 45 on the section 25b, so that the parts may be set to any desired angular position within a reasonable range, and may be clamped in such position by means of a clamping nut 47 on a bolt mounted on the section 25a and extending through an arcuate slot 49 in the section 25b.

By this arrangement, the axis of the shaft 27 may be shifted to a non-parallel position with respect to the direction of the guideway 23, so that the tool 31 may operate upon conical work, as indicated at 29a in Figs. 2 and 15. This same arrangement for adjusting the angular position of the axis of the shaft 27 relatively to the axis of the guideway 23 may be used with any of the different forms of tracks and cooperating rotary members shown in Figs. 1, 2, and 3, but has been omitted from these figures for the sake of simplifying the drawings.

In order to turn the work relatively to the tool as the work moves past the tool, there is provided on the frame of the machine a track designated in general by the numeral 51, cooperating with a rotary member mounted on the carriage 25 and designated in general by the numeral 53, which rotary member rolls on and is turned by the track as the carriage is moved along the frame, the rotary member being operatively connected to the work shaft 27 to turn this shaft and the work fastened thereto.

The track 51 extends in general in a direction parallel to the direction of the guideway 23. The track and the associated rotary member which rolls upon it may take various forms without departing from the present invention.

In the embodiment shown in Fig. 1, the track 51 is a flexible band or cord 51c, preferably in the form of steel or other metallic wire, wrapped one or more times around the rotary member 53c, so that as the carriage 25 moves along the guideway 23, successive portions of the flexible track 51c are constantly being wound onto the wheel 53c and other portions thereof are constantly being unwound therefrom. Preferably one end of the flexible track 51c is fixed to one point of the supporting bracket 55, as indicated at 61, and the other end of the track is secured to a shaft 63 rotatably mounted in the bracket 55 at another point, to which shaft is fixed a ratchet 65 cooperating with a pawl 67 so that the shaft 63 may be turned to tighten the track band 51c to any desired degree of tightness and the pawl and ratchet will hold the track in its tightened condition.

In Fig. 2, the track 51c and wheel 53c may be the same as mentioned in connection with Fig. 1.

In the arrangement shown in Fig. 3, the rotary member 53e is mounted directly on the work carrying shaft 27, and is in the form of a wheel without teeth, which rolls on the track 51e in the form of a flexible member like the track 51c in Fig. 1. Due to the arrangement of the wheel 53e in a plane transverse to the direction of movement of the carriage 25 along the guideway 23, it is necessary here to run the track band 51e over intermediate guide rollers 71 and 73 mounted on the carriage 25. One end of the track band 51e is secured to a shaft 61e while the other end is secured to a shaft 63e, these shafts being mounted either directly on the machine frame 21 or preferably on a bracket 55 like that mentioned above. The shaft 63e may have the same ratchet 65 and pawl 67 as shown in Fig. 1, for the purpose of tightening the band 51e.

In all of these arrangements, the rotary member 53 which rolls on the track is operatively connected in a suitable manner with the shaft 27, so that rotation of the rotary member is transmitted to the shaft. In the arrangement shown in Fig. 3, the rotary member 53e is removably mounted directly on the work holding shaft 27, no intermediate transmission gears being necessary. By removing this rotary member and substituting other rotary members of different diameters, a different ratio of turning movement to longitudinal movement of the work is attained.

A reversal of direction may be attained with the arrangement shown in Fig. 3, by reversing the threading of the flexible track 51e relatively to the rotary member 53e. That is, the left end of the track can be placed near the bottom of the shaft 61e instead of near the top thereof, so that it extends to the bottom of the rotary member 53e, while the right hand portion of the track may leave the top of the rotary member 53e and extend thence to a point near the top of the shaft 63e. The shafts 61e and 63e and the rollers 71 and 73 are sufficiently long to accommodate considerable change in the height of the track, when the direction of rotation is to be reversed or when a larger or smaller diameter of rotary member is to be substituted to obtain a different ratio of rotation of the work relatively to longitudinal movement thereof.

Usually it is preferred not to have the rotary member 53 mounted directly upon the work holding shaft 27, as in Fig. 3, but to mount it on a separate shaft 75, as shown in Figs. 1 and 2, the axis of which is approximately in a plane perpendicular to the direction of movement of the carriage 25 along the guideway 23. This permits a more favorable location of the rotary member 53 with respect to the track 51, for the rotary member may rotate approximately in a plane parallel with the direction of travel of the carriage, making it easier to adjust the track to different diameters or positions of rotary members, and obviating the necessity of providing guide rollers 71 and 73, as in Fig. 3.

In the arrangement shown in Figs. 1 and 2, the shaft 75 carries a bevel gear 77 meshing with another bevel gear 79 on the shaft 27. Preferably these bevel gears have oblique teeth in order that, by suitable adjustment between the gears, backlash or play may be taken up or reduced to a minimum, giving greater accuracy. If desired, both of the gears 77 and 79 may be removably clamped on their respective shafts so they may be easily replaced by other gears of different diameters, to vary the transmission ratio between the shaft 75 and the shaft 27.

A change in the ratio of turning movement to longitudinal movement of the work thus may be obtained either by replacing the rotary member 53 with another rotary member of different diameter, or by changing the bevel gears 77 and 79 for other gears of different sizes, or by changing both the rotary member and the bevel gears. Usually a change of the bevel gears, although possible, is somewhat inconvenient. Also, since the rotary member is driven by friction, the use of a rotary member of very small diameter for obtaining the desired turning ratio is undesirable because it may cause slippage of the rotary member relative to the track on which it rolls, and the use of a rotary member of very large diameter is undesirable because it is cumbersome and requires an undesirably great space between the track and the axis of rotation of the rotary member. For these reasons it is desirable to have some convenient and easy way of changing the transmission ratio in order to avoid the use of excessively large or excessively small diameters of rotary members when the work is to be turned very slowly or very fast relatively to its longitudinal travel, and to accomplish this the arrangements shown in Figs. 4 to 8 are preferably employed.

Figure 5:
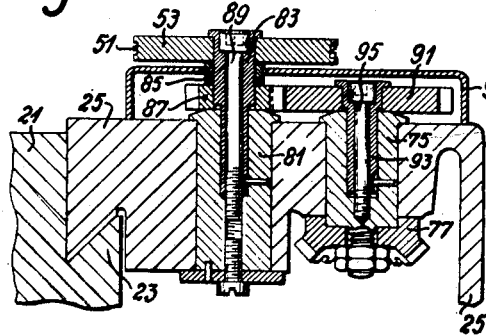
Fig. 5 is a section taken substantially on the line 5—5 of Fig. 4.

Referring first to Figs. 4 and 5, instead of mounting the rotary member 53 directly on the shaft 75 which carries the bevel gear 77, the rotary member may be mounted on another shaft 81 journaled in the carriage 25 and approximately parallel to the shaft 75. The rotary member 53 may be carried by a sleeve 83 and spaced by a spacer sleeve 85 from a small gear 87 also detachably carried by the sleeve 83. A pin 89, extending through the sleeve 83 and threaded into the shaft 81, holds the parts firmly together, locking them to each other so that the members 53, 81, and 87 all turn together as a unit. The gear 87 meshes with a large gear 91 detachably mounted on another sleeve 93 held on the shaft 75 by a threaded pin 95 similar to the pin 89.

A removable cover 97 encloses the gears 87 and 91, and has an opening through which the spacer 85 extends, so that the rotary member 53 is outside the cover 97 and may roll upon the track 51.

The two sleeves 83 and 93 have their ends which fit into the shafts 75 and 81 of the same diameter, so that either sleeve may be placed interchangeably in either shaft, and the gear receiving parts and rotary member receiving parts of the two sleeves are also of the same diameter, so that the rotary member or either gear may be placed on either sleeve. The cover 97 is reversible so that the opening therein may be brought into alinement with either shaft. When the gears are arranged as shown in Figs. 4 and 5, the work shaft 27 is turned quite slowly relatively to the longitudinal feeding of the work, without the use of a rotary member 53 of such a large diameter that it would be cumbersome.

If the gears are reversed, placing the large gear 91 on the sleeve 83 on the shaft 81, and placing the small gear 87 on the sleeve 93 on the shaft 75, then the work shaft 27 is turned quite fast with respect to the longitudinal feeding of the work, without the necessity of using a rotary member 53 of such small diameter that there would be danger of slipping on the track. When operating upon work pieces which can be turned by using rotary members of favorable diameter without intermediate gears to change the transmission ratio, then the long sleeve 83 and the rotary member 53 may be mounted on the shaft 75 rather than the shaft 81, so that the rolling of the member 53 on the track turns the shaft 75 directly, the transmission gears 87 and 91 not coming into play.

Replacement of the gears 87 and 91 by other gears of different diameter, to give still other transmission ratios between the rotary member and the work, is also possible whenever desired.

Figure 7:
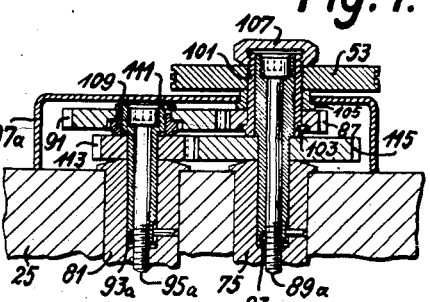
Fig. 7 is a similar section with the gears arranged for still another ratio of turning movement.
Figure 6:
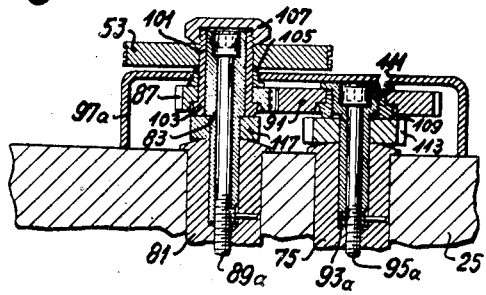
Fig. 6 is a similar section through a modification of the construction shown in Figs. 4 and 5, with the gears arranged for one ratio of turning movement.
Figure 8:
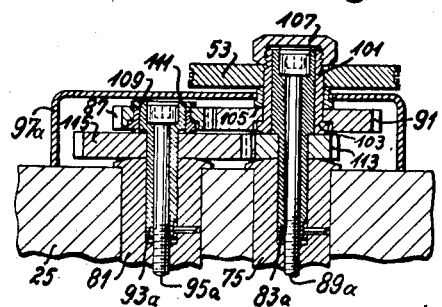
Fig. 8 is a similar section with the gears arranged for still another ratio.

If a still greater range of change in transmission ratio than that provided by the arrangement shown in Figs. 4 and 5 is desired, then the gearing shown in Figs. 6, 7 and 8 may be employed. Here, the shafts 75 and 81 remain as before, the bevel gear 77 being mounted as before on the shaft 75 for meshing with the bevel gear 79 on the work holding shaft 27.

The sleeve 83a, corresponding in general to the sleeve 83 in Figs. 4 and 5, is fastened as before by a threaded pin 89a, either to the shaft 81, when only one gear transmission stage is desired between the rotary member 53 and the bevel gear shaft 75, or to the shaft 75, when more than one gear transmission stage is desired between these parts. Rotatably mounted on the sleeve 83a, in either event, is a bushing 101 having at its lower end a flange 103. Either one of the gears 87 and 91, corresponding to the gears of the same numbers in Figs. 4 and 5, may be removably mounted on the bushing 101 and seated against the shoulder 103 thereon. On the bushing above the gear is a spacing sleeve 105 which has a flange underlying the edge of a cover 97a, corresponding in general to the cover 97 in Figs. 4 and 5, to prevent endwise movement of the bushing 101 off of the sleeve 83a. The rotary member 53 is placed on the bushing 101 above the spacing sleeve 105, and is clamped thereon by the threaded cap 107 which is screwed down sufficiently tightly onto the bushing 101 to lock both the rotary member 53 and the gear non-rotatably to the bushing.

Another sleeve 93a, corresponding in general to the sleeve 93 in Figs. 4 and 5, carries a bushing 109 of the same diameter and shape as the lower part of the bushing 101, in order that either bushing may receive interchangeably either of the gears 87 and 91. The sleeve has a flange 111 at its upper end, overlying the gear and the bushing.

The lower portions of the two sleeves 83a and 93a, below the respective bushings 101 and 109, are of the same diameter, so that either one of a pair of gears 113 and 115 may be interchangeably mounted on these portions of the sleeves, or if it is not desired to use these gears, either one of them may be replaced by a spacing collar 117 of similar internal diameter. Tightening of the threaded pin 89a in the sleeve 83a will force this sleeve downwardly into the shaft 75 or 81 on which it is mounted, clamping the gear 113 or 115 or the spacing collar 117 (whichever of these three happens to be mounted on this sleeve) tightly between a shoulder on the sleeve and the end of the shaft, in a non-rotatable manner, without affecting the rotation of the bushing 101 on the sleeve.

Tightening of another pin 95a in the other sleeve 93a will cause the flange 111 to bear downwardly on the gear 87 or 91 mounted on the bushing 109, and will cause this bushing to bear downwardly on the gear 113 or 115 or the spacing collar 117, whichever is mounted on this sleeve, clamping all of these parts non-rotatably to whichever shaft 75 or 81 the sleeve 93a is mounted upon.

With this construction, several arrangements are possible, depending on the particular requirements of the work to be operated upon. For example, when only a single transmission stage between the rotary member 53 and the shaft 75 is required, the sleeve 83a may be placed on the shaft 81, and the sleeve 93a on the shaft 75, as indicated in Fig. 6. In this case, only one of the pair of gears 113 and 115 is used, the other being replaced by the spacing collar 117 which can be mounted on either of the sleeves 83a and 93a. When the small gear 87 is mounted on the bushing 101 on the sleeve 83a, and the large gear 91 is mounted on the sleeve 93a, then the parts function in substantially the same way as those illustrated in Figs. 4 and 5, the turning of the rotary member 53 producing relatively slow rotation of the shaft 75 and of the work shaft 27. If the gears 87 and 91 are exchanged, so that the large gear is directly connected to the rotary member 53 and the small gear is mounted on the shaft 75, then the rotation of the shaft 75 is speeded up relatively to the turning of the rotary member 53.

If still further slowing down or speeding up of the rotation of the work is required, it can be done without resort to a rotary member of unfavorable diameter, by placing the parts in the position shown in Fig. 7, for relatively slow rotation of the work, or in Fig. 8, for relatively fast rotation of the work. In both cases the sleeve 83a and the rotary member 53 are shifted from the shaft 81 to the shaft 75, as shown, the cover 97a being reversible so that the hole in the cover may be alined with either shaft. For slow rotation of the work, the small gear 87 is connected directly to the rotary member 53 by being placed on the bushing 101, and it drives the large gear 91 clamped on the sleeve 93a on the shaft 81. Turning of this shaft also turns the small gear 113 clamped thereto, which turns the large gear 115 clamped to the shaft 75.

For very fast rotation of the work, without the use of an unfavorably small diameter of rotary member, the gears may be rearranged as shown in Fig. 8. Here, the large gear 91 is mounted on the bushing 101 and turns with the rotary member 53, and this turns the small gear 87 on the shaft 81 at a greater speed. The large gear 115, clamped on the shaft 81 and turning therewith, then drives the small gear 113 on the shaft 75 at an increased speed.

In addition to rearranging the gears 87, 91, 113, and 115 in the different positions above mentioned, it is also possible to replace these gears by still other gears of different diameters, if a greater variety of transmission ratios is desired.

The work may be turned in either direction as required without necessitating any change in the gear transmission, but simply by changing the relationship of the rotary member and the track on which it rolls.

In the construction shown in Figs. 1 and 2, the flexible track 51c would be wrapped in the opposite direction around the rotary member 53c, the bracket 55 being shifted outwardly with respect to the frame 21 so that the track would leave the periphery of the rotary member at the opposite side thereof. The manner in which a reversal of direction can be secured with the constructions shown in Fig. 5 has already been explained.

To attain easily this change of direction of rotation of the work, especially with the track and rotary member constructions shown in Figs. 1 and 2, it is advisable, as already stated, that the bracket 55 should be adjustably mounted on the frame 21. Various forms of adjustable mounting of the bracket are possible, within the scope of the invention. For example, the bracket may be held to the frame 21 by a bolt 121 passing through a long slot 123 in the bracket, so that when the bolt is loosened, the bracket may be moved in the direction of the slot, to place the track along either desired side of the rotary member, or to position the track for cooperation with different rotary members of different diameters.

Figure 9:
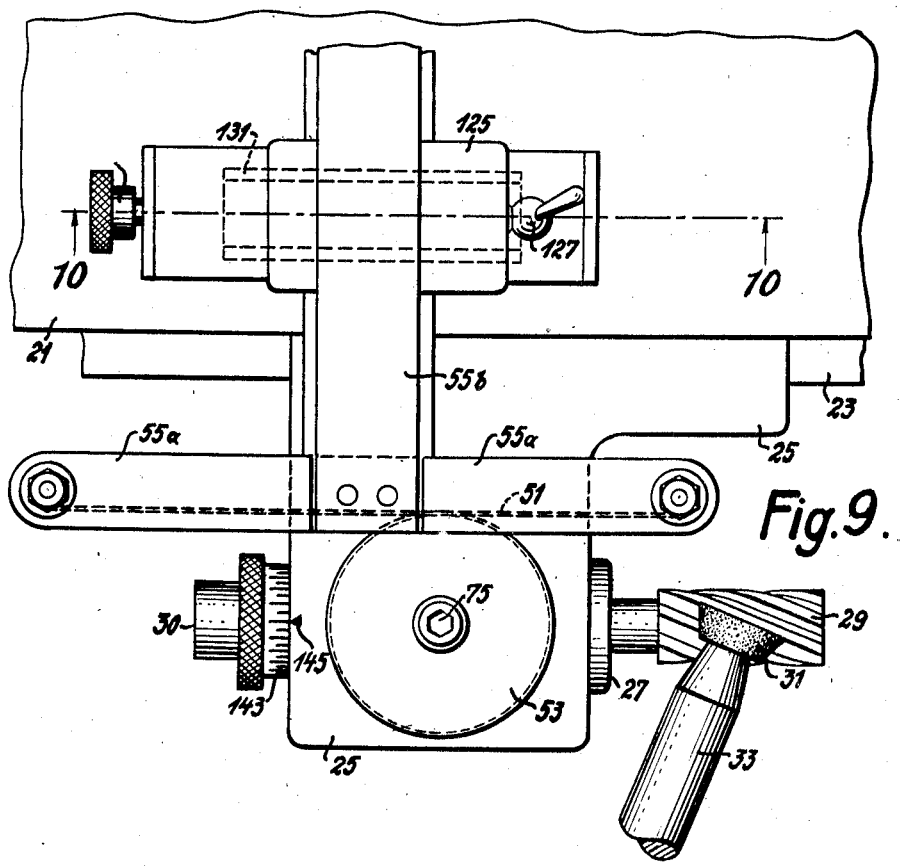
Fig. 9 is a diagrammatic plan illustrating details of an adjustable mounting for the track of the present invention.

A preferable form of mounting, however, is that shown in Figs. 9 and 15, where the track 51 is mounted on bracket arms 55a extending in the general direction of the track and rigidly attached to a transverse arm 55b slidably mounted in a block 125 on the frame 21, and clamped in the block by a clamp screw 127. When this clamp is loosened, the arm 55b may be moved in the direction of its length through the block 125, to bring the track 51 into cooperation with either side of the rotary member 53, and with rotary members of different diameters. The ends of the band or flexible member constituting the track may be secured to suitable studs, lugs, or shafts on the arms 55a, and the same ratchet 65 and pawl 67 arrangement previously described (Figs. 1 and 3) may be employed for tightening the track.

For the purpose of adjusting the track longitudinally with respect to any given position of the carriage 25, to turn the work 29 accurately with respect to the tool 31, the entire block 125 is preferably mounted to slide on the frame 21 along the guideway 131 (Fig. 10) in a direction substantially parallel to the length of the track. A feeding screw 133 mounted on the block 125 is threaded through a stationary block 135 on the machine frame, so that by turning the feeding screw 133, a fine adjustment of the block 125 along its guideway 131 and a fine turning adjustment of the work 29 with respect to the tool 31 is obtained without any longitudinal feeding of the carriage 25.

After one grinding operation on the work has been performed, as for example the grinding of one helical tooth on the cutter, then the work must be turned a fraction of a revolution relatively to the tool in order to bring the next helical tooth of the work into cooperation with the tool. This may be done conveniently by shifting the track lengthwise relatively to the work, by operating the feeding screw 133. Alternatively, it may be done by turning an adjusting graduated member 143 (Figs. 1 to 4, 9, and 11) mounted on the end of the shaft 27 and cooperating with an index mark 145 on the carriage 25. Preferably a suitable releasable clutch or coupling is interposed between the shaft 27 and the bevel gear 79, so that by releasing this connection, the shaft 27 and work 29 may be turned by the member 143, without turning the rotary member 53.

It is frequently convenient to make the rotary member with two or more portions of different diameters, so that the track may cooperate with a portion of one diameter when one work turning ratio is to be used, and with a portion of another diameter when another work turning ratio is to be used, without the necessity of removing the rotary member and replacing it with a different one.

Figure 11:
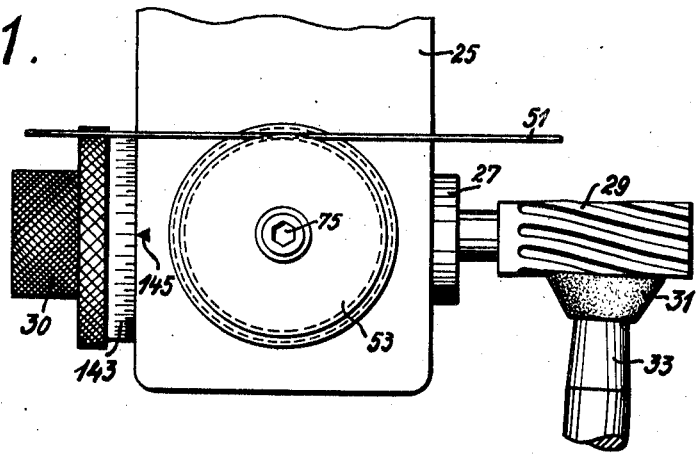
Fig. 11 is a diagrammatic plan illustrating a modified form of rotary member for rolling on the track.
Figure 12:
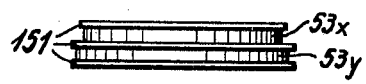
Fig. 12 is an edge view of such rotary member.

In Figs. 11 and 12, the rotary member indicated in general at 53 has a peripheral portion 53x of one diameter and another peripheral portion 53y of a larger diameter. If desired, radial flanges 151 may be employed between the two surfaces 53x and 53y and at the extreme edges of these two surfaces, to prevent the track from slipping laterally off of the intended surface.

In using this arrangement, the track 51 may be shifted in a direction axially of the shaft 75 on which the rotary member 53 is mounted, to bring the track into cooperation with one or another of the surfaces on the rotary member. Or, if preferred, the track may stay permanently in the plane of one of these surfaces on the rotary member, and if cooperation with the other surface is desired, the rotary member may be removed from the shaft 75 and replaced in an upside down position, thus bringing the other peripheral surface into the plane of the track.

Figures 13, 14:
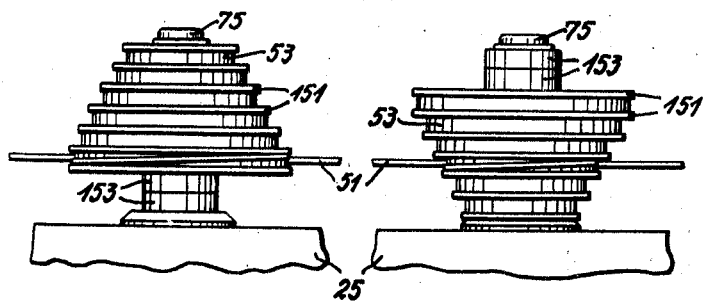
Fig. 13 is a similar edge view of another form of rotary member, in one position.
Fig. 14 is a view of the same in an inverted position.

The stepped idea may be employed when more than two diameters are desired on the rotary member, as shown in Figs. 13 and 14, where the rotary member is again indicated in general by the numeral 53, and it has a series of steps or peripheral portions of different diameters, as shown. As before, flanges 151 may be employed to separate the different surfaces from each other. The track may be shifted in a direction axially of the shaft 75 to bring it into cooperation with one or another of the surfaces on the rotary member. Or if this involves too great a shifting of the track, then the track may be shifted to a limited range to bring it into cooperation with some of the different surfaces on the rotary member, and for cooperating with other surfaces, the rotary member may be removed from the shaft and replaced in an upside down position. Or again, spacing members 153 may be employed on the saft 75 to place the rotary member 53 at the proper height so that the track cooperates with the desired peripheral portion. For instance, when the track is to cooperate with the portion of greatest diameter, as in Fig. 13, two spacing collars 153 may be placed below the rotary member 53 and no spacing collars above it, each collar preferably having an axial length equal to the axial spacing of the successive rolling portions of the rotary member. If the track is to cooperate with the next to the largest portion, one spacing collar 153 may be used below the rotary member, and one above it, thus bringing this second portion into the plane of the track, without shifting the plane of the track. If rolling of the track on the second from the largest diameter portion is desired, then both of the spacing collars may be placed above the rotary member. For the other three portions of different diameters, the rotary member may be removed from the shaft and turned upside down as in Fig. 14, and used with two collars, one collar, or no collar below it, depending on which portion the track is to run upon.

The various features described in connection with Figs. 4 to 14, inclusive, are not inconsistent with each other, for most of them may be used together. In order to illustrate the possibility of using these features together, there is shown in Fig. 15 a machine which embodies, in a single structure, most of the features referred to.

Referring now to Fig. 15, it is seen that the carriage is in two parts, 25a and 25b, pivoted to each other at 41, in the same manner disclosed in Fig. 2, so that the machine is adapted to either cylindrical work or conical work.

It is also seen that the carriage section 25b carries the gearing arrangements described with references to Figs. 6, 7 and 8 for the purpose of securing a greater range of turning ratios without unduly large or unduly small rotary members 53. The rotary member 53 itself is also illustrated as being of the stepped formation shown in Figs. 11 and 12, having steps 53x and 53y of different diameters; but it could just as well have a greater number of steps, as in Figs. 13 and 14, if desired.

Figure 10:
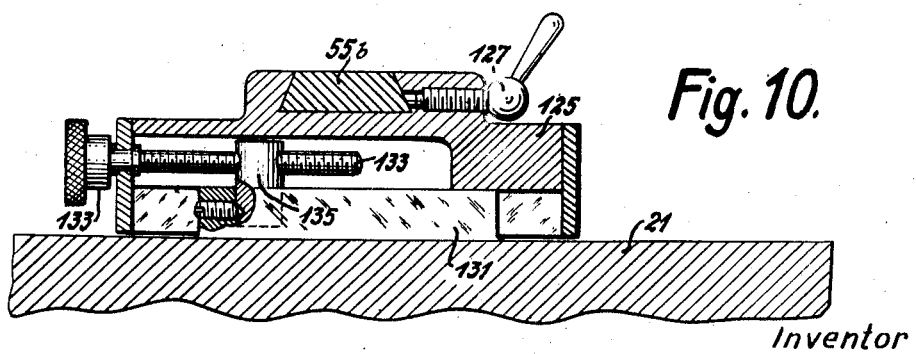
Fig. 10 is a section taken substantially on the line 10—10 of Fig. 9.

The track 51 on which the rotary member 53 rolls, is a flexible band, and is held by the same adjustable bracket arm arrangement 55a and 55b, slide 125, etc., described with reference to Figs. 9 and 10.

The parts in Fig. 15 are of the same construction as the respective parts bearing the same reference numerals in Figs. 1 to 14, so that no further description of Fig. 15 seems necessary.

It should be noted that in the preferred forms of construction herein disclosed, the rotary member 53 preferably has a smooth periphery rolling on a smooth track, no meshing gear teeth being provided on the rotary member or on the track. This feature of smooth periphery and smooth track is especially advantageous because it permits varying the transmission ratio in a smooth or "stepless" manner, by making the rotary member 53 of the proper diameter to give exactly the desired transmission ratio, and also it eliminates play or backlash between the rotary member and the track. When gear teeth are employed, some play is unavoidable, and a change from one ratio to the next higher or lower ratio must be through an abrupt step equivalent to the difference of one more or one less gear tooth on the rotary member. But when the rotary member has a smooth periphery rolling on a smooth track, then stepless changes in ratio are possible, since the diameters of different rotary members can differ from each other by almost infinitesimal increments. In speaking of the track or the rotary member as "smooth," this word is meant to indicate the absence of gear teeth, but is not meant to exclude slight roughening of the surface of the rotary member or of the track, for the purpose of increasing friction between these parts to eliminate any possibility of slippage.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A work turning device for creating a helical movement of work relatively to a tool, said device including a frame, a tool, a carriage mounted for movement on said frame, means on said carriage for holding work in position to be moved past said tool in cooperative relation thereto when said carriage is moved on said frame, a track in the form of a flexible band mounted on said frame and extending in a general direction substantially parallel to the direction in which said carriage moves and held against movement in said direction, a rotary member mounted on said carriage, said flexible band intermediate its end being wrapped around said rotary member so that said rotary member will be turned by the action of said band as said carriage moves on said frame, and an operative connection between said rotary member and said work to turn the work relatively to said tool from the rotation of said rotary member as said carriage moves on said frame, the movement of said carriage relatively to said frame including a component of motion in a direction parallel to the axis of rotation of said work, so that said work moves approximately helically relative to said tool.

2. A work turning device for creating a helical movement of work relatively to a tool, said device including a frame, a tool remaining in bodily stationary position relatively to said frame during an operation upon work, a work holding carriage mounted for movement on said frame to carry work held thereby past said tool in cooperative relation thereto, a continuous flexible band mounted on said frame and restrained against movement in the direction of movement of said carriage, a rotary member mounted on said carriage, said flexible band being wrapped around said rotary member so that said rotary member is turned by the action of said flexible band when said carriage moves, and means operated by the turning of said rotary member for turning said work relatively to said tool as said carriage moves to carry said work past said tool, the movement of said carriage relatively to said frame including a component of motion in a direction parallel to the axis of rotation of said work, so that said work moves approximately helically relative to said tool.

3. A work turning device for creating a helical movement of work relatively to a tool, said device including a frame, a tool, a carriage mounted on said frame for movement thereon, a work carrying shaft mounted on said carriage and having an axis extending in the general direction of the movement of said carriage on said frame, a rotary member mounted on said carriage, a track in the form of a continuous flexible band wrapped completely around said rotary member and having its ends extending tangentially thereto approximately parallel to the direction of movement of said carriage and held against movement in said direction, so that said rotary member is turned by engagement with said track when said carriage is moved on said frame, and means operated by the turning of said rotary member for turning said shaft and the work carried thereby relatively to said tool as said carriage moves on said frame, the movement of said carriage relatively to said frame including a component of motion in a direction parallel to the axis of rotation of said work carrying shaft, so that said work moves approximately helically relative to said tool.

4. A work turning device including a frame, a tool, a carriage movable on said frame for movement thereon, a work carrying shaft rotatably mounted on said carriage to hold a piece of work to be moved past said tool in cooperative relation thereto as said carriage is moved on said frame, means for adjusting the axis of said shaft to different angular positions with respect to the direction of movement of said carriage on said frame, a smooth track mounted on said frame, and means including a rotary member mounted on said carriage and having a smooth periphery contacting with said track to roll thereon as said carriage is moved on said frame, for turning said shaft and the work carried thereby relatively to said tool as said carriage moves on said frame.

5. A construction as described in claim 4, in which said track is in the form of a continuous flexible member wrapped at least one complete turn around said rotary member.

6. A work turning device for creating a helical movement of work relatively to a tool, said device including a frame, a tool, a carriage mounted for movement on said frame, a work holding element mounted on said carriage for holding work in position to be moved past said tool in cooperative relation thereto when said carriage is moved on said frame, a track in the form of a continuous flexible band mounted on said frame and extending mainly in a general direction substantially parallel to the direction of movement of said carriage, a rotary member mounted on said carriage and having said track wrapped around its periphery to be turned thereby when said carriage is moved on said frame, and means including a plurality of interchangeable gears of different diameters for operatively connecting said work holding element to said rotary member to turn said element and the work held thereby from the rotation of said rotary member.

7. A work turning device for creating a helical movement of work relatively to a tool, said device including a frame, a tool, a carriage mounted for movement on said frame, a work holding element rotatably mounted on said carriage for holding work in position to be moved past said tool in cooperative relation thereto when said carriage is moved on said frame, a track in the form of a continuous flexible band mounted on said frame and extending mainly in a general direction substantially parallel to the direction of movement of said carriage, two shafts mounted on said carriage for rotation about axes approximately parallel to each other, gears operatively connecting one of said shafts to said work holding element to rotate said element from rotation of said one of said shafts, interchangeable gears for operatively connecting said two shafts to each other to rotate one from the other, a rotary member around which said flexible band track is wrapped, and means for mounting said rotary member interchangeably on one of said shafts in position to roll on said track and be turned thereby as said carriage is moved on said frame.

8. A work turning device for creating a helical movement of work relatively to a tool, said device including a frame, a tool, a carriage mounted for movement on said frame, a work holding element rotatably mounted on said carriage for holding work in position to be moved past said tool in cooperative relation thereto when said carriage is moved on said frame, a track mounted on said frame, two shafts mounted on said carriage for rotation about axes approximately parallel to each other, gears operatively connecting one of said shafts to said work holding element to rotate said element from rotation of said one of said shafts, a bushing, means for mounting said bushing rotatably and interchangeably on one of said shafts, a rotary member mounted on said bushing in position to roll on said track to be turned thereby and to turn said bushing therewith as said carriage is moved on said frame, a gear removably mounted on said bushing and rotating therewith, and changeable gear means operatively connecting said bushing gear to that one of said shafts which is operatively connected to said element.

9. A work turning device including a frame, a tool, a carriage mounted for movement on said frame, a work holding element mounted on said carriage for holding work in position to be moved past said tool in cooperative relation thereto when said carriage is moved on said frame, a track mounted on said frame, a rotary member mounted on said carriage and contacting with said track to roll thereon and be turned thereby when said carriage is moved on said frame, said rotary member having a plurality of peripheral portions of different diameters, any one of which may be made to roll on said track, and means operatively connecting said rotary member to said work holding element to turn said element and the work held thereby from rotation of said rotary member.

10. A construction as described in claim 9, further including means for mounting said rotary member on said carriage in different positions spaced from each other in a direction axially of said rotary member, so that the selected peripheral portion thereof may be brought opposite said track.

11. A work turning device for creating helical movement of work relatively to a tool, said device including a frame having an approximately horizontal guideway thereon, a tool, a carriage mounted for movement along said guideway, a work carrying shaft mounted on said carriage with its axis extending substantially horizontally and approximately parallel to the direction of movement of said carriage, said shaft being adapted to hold work in a position to be moved past said tool in cooperative relation thereto, a pair of substantially vertical shafts mounted on said carriage, one of said vertical shafts being operatively connected to said work carrying shaft to drive the same, said vertical shafts being adapted to receive adjacent their upper ends interchangeable intermeshing gears for establishing driving relations between said two vertical shafts at different ratios, a wheel removably mounted substantially at the upper end of one of said two vertical shafts, a bracket mounted on said frame, and a flexible band mounted on said bracket and extending in a general direction substantially parallel to said guideway, said band intermediate its ends being wrapped around said wheel so that as said carriage moves along said guideway, said wheel will roll on said flexible band and cause turning movement of said work carrying shaft in proportion to the longitudinal travel thereof.

12. A work turning device for creating helical movement of work relatively to a tool, said device including a frame, a tool, a carriage mounted for movement on said frame, a work holding element mounted on said carriage for holding said work in position to be moved past said tool in cooperative relation thereto when said carriage is moved on said frame, a shaft mounted on said carriage, a wheel removably mounted on said shaft, means operatively connecting said wheel to said work holding element to turn said element and the work held thereby from rotation of said wheel, a bracket mounted on said frame, a flexible band mounted on said bracket and extending in the general direction of movement of said carriage and held against movement in said direction, said band intermediate its ends being wrapped around said wheel to cause rotation of said wheel when said carriage is moved, and means for adjusting said bracket to move said flexible band toward and away from said shaft on which said wheel is mounted to accommodate the position of said band to different diameters of wheels which may be mounted on said shaft.

KURT ZWICK.